United States Patent [19]

Rudich, Jr.

[11] Patent Number: 4,510,547

[45] Date of Patent: Apr. 9, 1985

[54] MULTI-PURPOSE COMPRESSOR CONTROLLER

[75] Inventor: George Rudich, Jr., Goshen, Ind.

[73] Assignee: Johnson Service Company, Milwaukee, Wis.

[21] Appl. No.: 440,863

[22] Filed: Nov. 12, 1982

[51] Int. Cl.³ .................... H02H 7/00; H02H 5/04
[52] U.S. Cl. .................................. 361/22; 361/24; 361/25; 361/106; 361/92
[58] Field of Search .................. 361/22, 24, 25, 27, 361/106, 92

[56] References Cited

U.S. PATENT DOCUMENTS

| | | | |
|---|---|---|---|
| 3,585,451 | 6/1971 | Dax | 361/22 |
| 4,038,061 | 7/1977 | Anderson et al. | 361/22 X |
| 4,281,358 | 7/1981 | Plouffe et al. | 361/22 |

Primary Examiner—Patrick R. Salce
Attorney, Agent, or Firm—Larry L. Shupe; Joseph J. Jochman, Jr.; John Phillip Ryan

[57] ABSTRACT

The compressor motor controller of the present invention includes a hot motor detector adapted to be coupled to a plurality of temperature sensors for detecting an overtemperature condition of the compressor motor. The hot motor detector incorporates logic switching means for generating a motor control signal. A self diagnostic sensor is coupled to the hot motor detector for detecting an electrically shorted condition of the temperature sensors while a low voltage detector is coupled to the hot motor detector for sensing a low line voltage condition. Means are provided for protecting the compressor motor against the undesirable effects of short cycle operation while a lubricating oil pressure detector receives signals from a pressure transducer which are representative of oil pressure. A self-contained power supply provides a source of electrical power to the controller while an isolated output means is coupled to the separately mounted motor starting contactor for controllably energizing the compressor motor.

8 Claims, 2 Drawing Figures

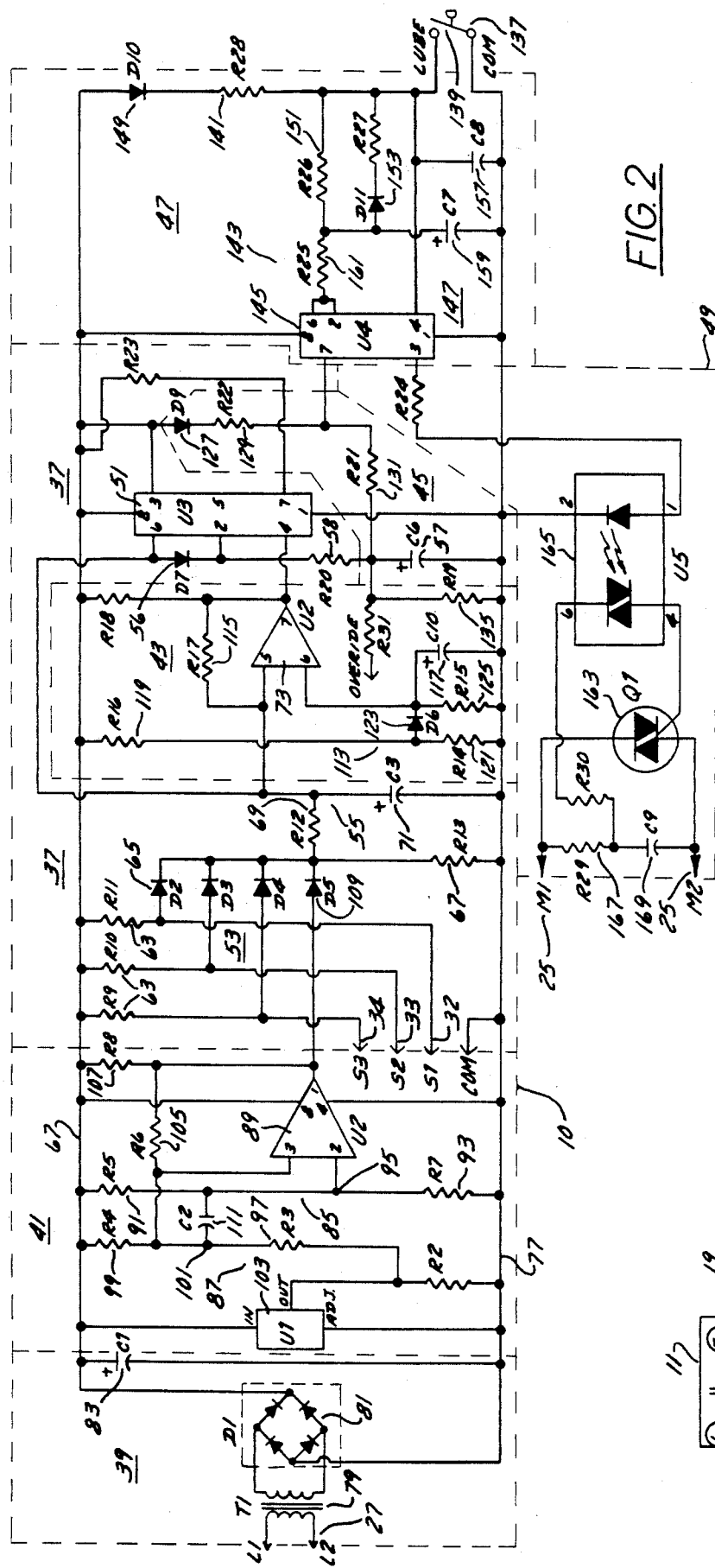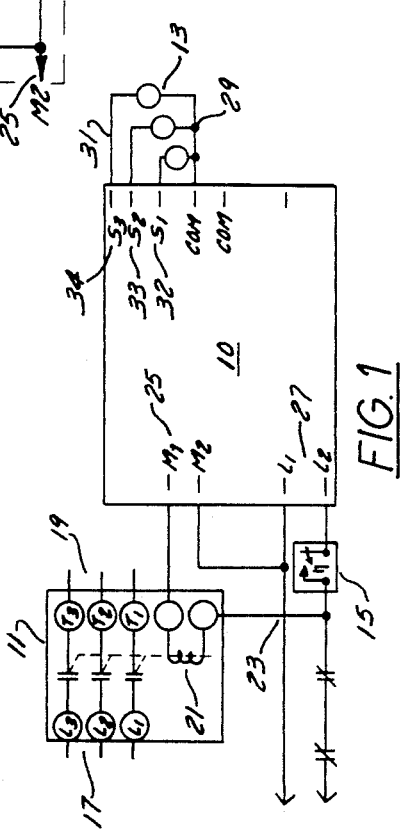

MULTI-PURPOSE COMPRESSOR CONTROLLER

BACKGROUND OF THE INVENTION

This invention relates generally to controllers for electrically-driven compressors and more particularly to multipurpose compressor controllers for monitoring a variety of motor and compressor operating parameters and controlling the motor in accordance therewith.

One known compressor control apparatus is constructed for monitoring only the temperature of the compressor motor and de-energizing the motor in the event that an overtemperature condition is detected. Such overtemperature devices may take the form of overload relays which form a part of the motor starting contactor assembly and which are sensitive to motor current for selectively tripping the contactor in the event an excess current is detected which may result in undesirable motor heating. Another approach to the protection of compressor motors from excessive internal temperatures is to provide temperature sensors imbedded within the motor itself and a controller coupled thereto for receiving temperature related signals and de-energizing the motor if temperatures exceed prescribed limits.

Yet other compressor motor protective devices include separate equipments for protecting the motor against short cycle operation, for protecting the motor from overloads and/or protecting the compressor from accelerated wear in the event that the compressor lubricating oil system malfunctions. While these prior art devices have heretofore been satisfactory for compressor motor control they have failed to appreciate the advantages of providing an integrated compressor controller which is sensitive to a plurality of operating parameters and which is constructed and arranged to take advantage of the latest innovations in static switching devices. Additionally, the prior art has failed to appreciate the manner in which a controller may be constructed to incorporate certain self-diagnostic functions.

A compressor motor controller which combines a power supply together with hot motor, low voltage and low lubricating pressure detectors, which is capable of protecting the compressor motor against the undesirable effects of short cycle operation and which is capable of diagnostically detecting a fault in a motor temperature sensor would be a significant advance over the prior art.

SUMMARY OF THE INVENTION

In general, the inventive compressor motor controller includes a hot motor detector adapted to be coupled to a plurality of temperature sensors for detecting an overtemperature condition of the compressor motor. The hot motor detector incorporates logic switching means for generating a motor control signal. A self-diagnostic sensor is coupled to the hot motor detector for detecting a simultaneous electrically shorted condition of all of the temperature sensors while a low voltage detector is coupled to the hot motor detector for sensing a low line voltage condition. Means are provided for protecting the compressor motor against the undesirable effects of short cycle operation while a lubricating oil pressure detector receives signals from a pressure transducer which are representative of oil pressure. A self-contained power supply provides a source of electrical power to the controller while an isolated output means is coupled to the separately mounted motor starter for controllably energizing the compressor motor.

In a preferred embodiment, the hot motor detector is coupled to temperature sensors embedded within the compressor motor and is constructed and arranged such that the detector will be responsive to the temperature of the hottest sensor. Since failure of the motor temperature sensors may result in an undesirable, yet undetected operating condition, it is preferred that the controller include a shorted sensors detector capable of diagnosing such a condition and thereupon de-energizing the compressor motor. Since for a given motor load, a low line voltage will result in possibly-destructive elevated motor currents, the controller also includes means for detecting a low line voltage condition. Signals from the low voltage detector and from the shorted sensors detector are directed to a logic switching means capable of simultaneously monitoring these signals and de-energizing the compressor motor whenever either signal reaches a predetermined value.

The mechanical structure of a compressor may be severly damaged if the compressor is stopped and thereafter quickly restarted under pressure and it is therefore desirable that a controller include means for preventing short cycle operation. Accordingly, the inventive controller also includes a short cycle protective means having an RC timing circuit to prevent repetitive, short cycle energization of the compressor motor. The short cycle protective means is coupled to the logic switching means in a manner such that short cycling is prevented, irrespective of whether the causative condition is related to low voltage, a hot motor, a shorted sensor or a loss of electrical power, the latter whether by failure of the distribution system or by rapid cycling of the system thermostat.

In order to assure that the compressor is operated only when properly lubricated, a pressure detector is coupled intermediate a pressure transducer and the hot motor detector for de-energizing the compressor motor in the event of insufficient lubrication pressure. Upon compressor startup, a short time will be required for the lubrication system to reach a the minimum operating pressure and it is therefore preferred that the pressure detector be constructed to delay motor de-energization until after the lapse of this time period. On the other hand, the loss of lubrication pressure after it has once been established may result in compressor damage if permitted to continue for the same time period necessary to reach proper lubricating oil pressure upon initial startup. Therefore, the controller preferably will provide a shortened second time delay period for de-energizing the motor if lubrication pressure is lost after having been established at initial startup.

A full-wave rectified power supply is coupled to the low voltage detector for powering the controller while an output section is coupled to the hot motor detector for controllably energizing the coil of an electromagnetic line starter used for switching the compressor motor. Switching of the highly inductive starter coil or the occurrence of shorted coil turns may result in voltage spikes or transients which could damage the controller and the output means is preferably constructed to isolate these transients from the balance of the controller circuitry. A preferred way of effecting such isolation is by an opto coupler device.

It is an object of the invention to provide a new and improved controller for air conditioning and refrigeration compressor applications.

Another object of the invention is to provide a controller capable of monitoring a variety of operating parameters and selectively energizing the compressor motor in accordance therewith.

Yet another object of the invention is to provide a controller capable of sensing a hot motor, low voltage and low lubricating oil pressure conditions.

Still another object of the invention is to provide a controller which includes a self-diagnostic function for detecting a simultaneous shorted condition of the motor temperature sensors.

Still another object of the invention is to provide a controller having an output means constructed and arranged for preventing voltage transients from being reflected into the controller logic circuitry. How these and other objects of the invention are accomplished will become more apparent from the detailed description thereof taken with the accompanying drawing.

DESCRIPTION OF THE DRAWING

FIG. 1 is a block diagram of the compressor controller shown in conjunction with motor temperature sensors, a motor starter and a thermostat as used on compressor installations, and;

FIG. 2 is a detailed schematic diagram of the controller of FIG. 1.

DETAILED DESCRIPTION OF A PREFERRED EMBODIMENT

In FIG. 1, the compressor motor controller 10 is shown in conjunction with a line starter 11 for selectively energizing the compressor motor, a group of heat sensors 13 and a thermostat 15 for setting the temperature which is desired to be provided by the refrigeration or air conditioning unit. The three phase line starter 11 includes a plurality of line power connectors 17 for attachment to a source of three phase electrical power and a plurality of load power connectors 19 for attachment to the compressor motor. The electromagnetic starter coil 21 is coupled to a source of control circuit power 23 in a manner such that when the motor terminals 25 of the controller 10 are electrically coupled together, the coil 21 is energized to close the starter 11 and start the motor. As is common industry practice, it should be appreciated that the leads comprising the source of control circuit power would normally be coupled directly or indirectly through a control transformer to those line power connectors 17 designated L1-L2 by the line starter manufacturer. Control bus terminals 27 are provided on the controller 10 for connection to the input side thereof. The motor temperature sensors 13 are typically embedded within the motor frame by the motor manufacturer, each sensor 13 having a first lead 29 commonly connected one to the other and a second lead 31 separately connected to the first, second and third sensor terminals, 32, 33, 34 respectively, located on the controller 10.

Referring next to FIGS. 1 and 2, the controller 10 is shown generally to include a hot motor detector 37, a power supply 39, a low voltage detector section 41, a shorted sensors detector 43, a short cycle protective section 45, a lubrication oil pressure detector 47, and an isolated output section 49. Because the hot motor detector 37 includes the principal logic switching means 51 and is the dominant controller section through which all other sections of the controller are interconnected to the isolated output section 49, its construction and operation will be first described.

The hot motor detector 47 includes a bridge section 53 for coupling to the sensors 13, an output receiver 55 for sensing voltage signals generated by the bridge section 53 and a logic switching means 51 for the reception of control signals. A diode 56 maintains pin 2 of means 51 even though pin 6 thereof is switched to a logic "0". In that manner, discharge of the capacitor 57 is caused to be the only event by which pin 2 of means 51 may be brought to a logic "0" state. A resistor 58 is provided as a short circuit current limiter so that the voltage across the resistor 69 will not be materially affected even though pin 4 of means 51 may inadvertently be shorted to the common bus 77. The bridge section 53 is comprised of a plurality of bridge resistors 63, each of which is coupled by a diode 65 to a first resistor 67 of the output receiver 55. Each resistor 63 has one lead coupled to its respective hot motor sensor terminal 32, 33 or 34 and the other lead to the controller positive bus 67. The sensors 13 are preferably thermistors of the positive temperature coefficient type and when connected as shown and described, the resulting voltage across the resistor 67 will be controlled by the hottest sensor 13. The output receiver 55 includes a second resistor 69 and a receiver capacitor 71 for providing transient filtering, the resistor 69 and the capacitor 71 having values selected in a known manner to provide a desired controller response time upon reception of an appropriate sensor signal. The voltage across the capacitor 71 is directed to the noninverting input pin 5 of a first comparison means 73, preferably a comparator chip, within the shorted sensors detector 43 and to the threshold pin 6 of the logic switching means 51. The logic switching means 51 is preferably constructed of a timer integrated circuit chip and has a threshold trip point voltage and a trigger voltage which are internally set at two thirds and one third, respectively, of the voltage appearing at pin 8. So constructed, the switching means 51 will switch its output pin 3 to a logic "0" whenever the voltage across the capacitor 71 exceeds two thirds of the voltage on pin 8 and will switch the output pin 3 to a logic "1" whenever the voltage at the trigger input pin 2 falls below one third of that at pin 8. Viewed another way, the output pin 3 will be switched to a logic "1" when the voltage on the capacitor 71 less the voltage drop across the diode 56 is less than one third of the voltage applied to the pin 8. The logic switching means 51 also includes a reset pin 4 which permits prioritizing of those signals received at pins 2, 4 or 6. More specifically, connection of pin 4 to the common bus 77 will switch pin 3 to logic "0" irrespective of the signals appearing at pins 2, or 6.

The controller power supply 39 is shown to include a stepdown input transformer 79, a full-wave bridge rectifier 81 and a line voltage capacitor 83. In order to permit the low voltage detector section 41 to generate an appropriate signal for disabling the motor when line voltage becomes dangerously low while yet avoiding spurious shutdowns of the compressor motor, it is preferable that the voltage across the capacitor 83 be an accurate representation of the voltage applied at the primary winding of the input transformer 79. It is therefore preferred that the transformer coil ratio, the voltage drop across each diode in the bridge rectifier 81 and the value of the capacitor 83 be carefully selected in a known manner so that the voltage across the latter is representative of the primary input voltage. In a preferred embodiment, the aforementioned components are selected such that a voltage of 25 V. D.C. appears across the capacitor 83 when 240 V. 60 Hz is applied to the input winding of the transformer 79. Additionally, the value of the capacitor 83 is preferably selected in view of the current requirements of the controller 10 so as to provide an acceptably low response time in detecting a low voltage condition. The illustrated circuit provides a response time of approximately 65 millisec. upon a reduction in line voltage equal to one half rated voltage. This preferred maximum response time has been so selected in order to prevent the contactor coil 21 and electromagnetic armature structure of commonly-employed motor starting contactors from losing substantial holding force which would otherwise permit the current carrying contactor tips to come to a lightly touching position. In such a position, tip arcing and consequent tip welding may occur, making it impossible to de-energize the compressor motor.

The low voltage detector section 41 includes a first circuit 85 for generating the first biasing voltage, a second circuit 87 for generating a second bias voltage which is offset from the first bias voltage and second means 89 for comparing the bias voltages. More particularly, the second comparison means 89 comprises a high impedance comparator including an inverting input terminal pin 2 for receiving the first bias voltage and a noninverting input terminal pin 3 for receiving the second, offset bias voltage. The first circuit 85 comprises a voltage divider formed by the resistors 91 and 93 having a tap 95 therebetween connected to the input terminal pin 2. Similarly, the second circuit 87 includes a voltage divider formed by the resistors 97 and 99, the output node 101 of which is offset above the voltage of the common bus 77 by a specified reference voltage which, in a preferred embodiment, is 1.25 V. taken at the output terminal of the voltage regulator 103.

While it is desirable for optimum operation of the low voltage detector section 41 that a substantial portion of the A.C. ripple voltage present on the capacitor 83 be prevented from affecting the detector section 41, neither of the input terminals pins 2 or 3 of the comparison means 89 may be heavily filtered if the response time of the detector section 41 is to be maintained below the preferred maximum of 65 millisec. Accordingly, when the low voltage detector section 41 is constructed as described and as shown in FIG. 2, substantial A.C. ripple is removed by taking advantage of the common mode characteristics of the comparison means 89. The common mode input range of the comparison means 89 is specified by its manufacturer and so long as the input terminal pin 2 is maintained at or above a predetermined voltage above that of the ground bus while the voltage at the input terminal pin 3 of means 89 is maintained at or below a specified voltage below the positive B+ bus 67, any rippling changes in the voltage appearing at the terminals 2 and 3 will do so simultaneously so that the voltage difference therebetween is a substantially constant D.C. voltage. Additionally, the illustrated and described arrangement takes advantage of the voltage regulating accuracy of the regulator 103. The low voltage detector section 41 also includes a resistor 105 for providing a positive feedback signal to the input terminal pin 3 of comparator means 89 and a pull-up resistor 107 which provides a signal to the diode 109 when a low voltage condition exists. A filtering capacitor 111 is used for transient voltage filtering to prevent false triggering of the comparator means 89 should any short duration transients appear across the capacitor 83.

From the foregoing, it is apparent that the low voltage detector section 41 monitors the voltage across the capacitor 83 and maintains the output pin 1 of the comparator 89 in a logic "0" state until the voltage at input terminal pin 2 becomes less than that at input terminal pin 3. At that time, the comparator 89 is switched to a logic "1" state for providing a voltage signal to the resistor 67 through the diode 109 upon the occurrence of an undesirable low voltage condition. It should be further appreciated that such a signal provided to the resistor 67 simulates a hot sensor signal which is directed to the shorted sensors detector 43. The values of the resistors 91 and 93 may be varied in a known manner and depending upon the desired trip point, but preferably should be selected to maintain the input voltage within the common mode input range of the comparator 89.

The shorted sensors detector 43 is shown to include first means 73 for comparing a plurality of voltages, a network 113 for biasing the comparison means 73, means 115 for providing a comparator feedback signal and capacitor means 117 for preventing spurious, oscillating switching of the comparison means 73. The comparison means 73 includes a non-inverting input pin 5 connected to monitor the voltage across the capacitor 71 of the hot motor detector output receiver 55. The biasing network 113 is provided by the resistors 119, 121, diode 123 and resistor 125 for setting a biasing voltage at the inverting input pin 6 which will be precisely equivalent to the voltage at input pin 5 whenever the resistance of the hottest sensor 13 rises to a value equal to the resistance of resistor 121. So long as the voltage at input pin 5, that across the capacitor 71, exceeds the voltage at pin 6, that across the resistor 125, the comparison means 73 is maintained in a non-tripped state and its output pin 7 is at a voltage above that of the common bus 77. If the voltage across the capacitor 71 declines to a value less than that across the resistor 125, the comparison means 73 trips, the output terminal pin 7 is effectively connected to common bus 77 and the reset override terminal pin 4 of logic switching means 51 is likewise coupled to common bus 77. Any output signal appearing at pin 3 of means 51 is thereby switched to a logic "0" irrespective of any signals which may appear on pin 6 or pin 2 thereof. The shorted sensors detector 43 thereby permits the compressor to operate if the resistance of any sensor is above that of resister 121. This is true so long as the resistive values of the sensors are all below the cut out value established by the voltage divider comprised of the sensor and its associated resistor 63 and by the switching characteristic of the comparison means 73. "The shorted sensors detector 43 also switches means 51 to a logic "0" to de-energize the compressor motor only when all of the sensors 13 exhibit a resistance less than that of resistor 121 and/or the line voltage falls to an unacceptably low value." The feedback means 115, preferably a resistor, provides a small amount of positive feedback while the capacitor 117 prevents oscillating switching. In order to assure proper temperature compensation, it is preferred that the value of resistor 119 be equal to that of each of the resistors 63; the value of resistor 125 be equal to that of resistor 67 and that the voltage drop characteristic of the diode 123 be equal to that of any one of the diodes 65. The value of the resistors 63, 119, which are preferably equal to one another, may be varied in accordance with the trip point desired.

Mechanical damage to the compressor may otherwise be caused by stopping and immediate restarting of the compressor under pressure and therefore, it is preferred that the controller incorporate a short cycle protective section 45. Accordingly, and in view of the fact that the isolated output section 49 will normally be switched to a motor-energizing state whenever output pin 3 of the logic switching means 51 is at logic "1", the unique section 45 is shown to include means for preventing the output pin 3 of means 51 from changing to a logic "1" state unless it has been maintained at a logic "0" state for a predetermined minimum time. More specifically, the section 45 includes a first diode 127, first and second resistors, 129 and 131 respectively, and a capacitor 57 cooperating to define a timing network. When the output pin 3 of the logic switching means 51 achieves a logic "1" state, the capacitor 57 is rapidly charged through the diode 127 and the resistor 129. In the event of a system fault, an event which will change the state of the output pin 3 to logic "0", the capacitor 57 commences discharge through the resistor 135. Should the fault clear before the voltage across the capacitor 57 declines to one-third the voltage at pin 8 of the logic switching means 51, pin 2 thereof is held at a logic state "0" for a predetermined minimum time until the voltage across the capacitor 57 diminishes to a level sufficiently low to provide a trigger signal to pin 2 of the switching means 51. The values of the components 57, 127, 129, 131, 135 defining the timing network and therefore the minimum short cycle delay may be selected in a known manner. For certain air conditioning applications, a short cycle delay of about 5 minutes may be acceptable while a more appropriate delay for refrigeration applications would be about 2 minutes. The components shown in FIG. 2 and described herein will result in a time delay of about two minutes.

Referring to FIGS. 1 and 2, the controller 10 further includes a lubrication oil pressure detector 47 for disabling the compressor if lubrication oil pressure declines to an undesirably low level. The pressure detector 47 is coupled intermediate the hot motor detector 37 and a differential pressure transducer 137 such as the type P51 transducer available from Johnson Controls, Inc., of Milwaukee, Wis. A preferred transducer 137 includes normally open electrical contacts 139 coupled in series with a resistor 141, the contacts 139 being held closed when lubrication pressure is at or above an acceptable value for adequate compressor lubrication. Upon compressor startup, a short time may be required for lubrication pressure to reach an acceptable value and the preferred detector 47 is configured to provide a starting delay time before detector enablement. The preferred detector 47 also includes means 143 for preventing false shutdown in the event of momentary, harmless declines in lube pressure below an acceptable level while yet providing compressor disabling in the event the duration of such a pressure decline is greater than a predetermined time. In a preferred embodiment, the detector 47 will cause compressor disabling if the time period over which the aforedescribed pressure remains below an acceptable value exceeds approximately one half of the starting delay time.

More specifically, the lubrication oil pressure detector 47 includes second logic switching means 145 for receiving control signals from the hot motor detector 37 and from a control network 147 linking the switching means 145 to the transducer 137. The isolated output section 49 is caused to energize the coil 21 of the motor starter 11 whenever the output pin 3 of the switching means 145 is at logic state "1". During those times when the output pin 3 of the first logic switching means 51 and therefore commonly connected pin 8 of second logic switching means 145 are at logic state "1", the logic state of output pins 3 and 7 of the switching means 145 will be controlled by signals received at commonly connected pins 6, 2 and at pin 4 of means 145.

The control network 147 includes a charging circuit comprising a diode 149, a pair of resistors 141, 151 and a discharging circuit comprising a diode 153 and resistor 155. A transient suppressing capacitor 157 is coupled in parallel with the transducer electrical contacts 139 for switching voltage attenuation. It is to be understood and appreciated that the construction of the switching means 145 is such that its output pin 3 is switched to a logic "0" whenever the trigger voltage applied at its pins 6, 2 exceeds two-thirds of the voltage applied at its pin 8.

Upon reception of a compressor starting signal at the control bus terminals 27 and assuming no hot sensors 13 are detected, pin 8 of switching means 145 will be brought to logic state "1" and the capacitor 159 will commence charging through the diode 149 and the resistors 141, 151. Upon reception of a compressor starting signal, the contacts 139 of the lube pressure transducer 137 will normally be open during that relatively short time period required for oil pressure to reach the minimum acceptable value for proper lubrication. The voltage to which the capacitor 159 is charged is controlled by the time required to close the transducer contacts 139. In normal operation, this voltage will be governed by the values of the resistors 141, 151 and will be below the aforementioned trigger voltage. The output pin 3 of switching means 145 is thereby permitted to hold logic state "1" to permit ongoing compressor operation. If, for any reason, the contacts 139 fail to close prior to the time at which the capacitor 159 becomes charged to the trigger voltage level, the output pins 3 and 7 of means 145 will switch to logic state "0", the switching of pin 3 functioning to disable the motor starter 11 and the switching of pin 7 functioning to discharge the capacitor 133 to common bus 77 through resistor 131. The capacitor 159 will thereafter continue charging to a voltage which differs from the voltage at pin 8 of means 145 only by the slight voltage drop across the diode 149.

Discharging the capacitor 57 in the aforementioned manner results in a manual reset for the lube oil pressure detector 47. More specifically, it is preferred that when the output pins 3 and 7 of the means 145 are switched to logic "0", they remain so even though power to the line power connectors 17 is interrupted and thereafter restored. Upon the interruption of power, the capacitor 159 commences discharging through the resistor 161 and the pins 2, 6 of means 145. If the capacitor 57 were not so discharged, reapplication of power to the control bus terminals 27 would reinitiate the short cycle protective section 45, thereby permitting the capacitor 159 to continue discharging. If the short cycle delay time were longer than the discharge time of the capacitor 159, the output pins 3, 7 of means 145 would be switched to a logic state "1" upon the switching of output pin 3 of means 51 to a logic state "1" and inadvertent energization of the isolated output section 49 and the motor line starter 11 would result. Construction and arrangement of the controller 10 in the aforementioned manner will provide manual reset for that length of time required to discharge the capacitor 159 to a voltage level which is one-third of that at pin 8 of means 145. This time is variable and may be modified in a known manner by selecting various values for the resistor 161 and the capacitor 159. However a range of manual reset times from 15 seconds to 120 seconds is preferred.

Referring again to FIG. 2, there is shown an isolated output section 49 coupled to the pressure detector 47 for controllably energizing the compressor motor. The isolated output section 49 includes a first power switching means 163, preferably a statically switched output triac, for controllably energizing the motor start coil 21 and an isolating output coupler 165 for receiving signals from the pressure detector 47 and providing gating power to the power switching means 163 in response to those signals. A series connected resistor 167 and capacitor 169 are coupled in parallel with the switching means 163 for protectively attenuating any otherwise-damaging transients. Arrangement in this manner provides for isolation of the output section 49 from the line voltage appearing at the line power connectors 27 and from the low voltage circuit of the controller 10 which is coupled to the secondary of the transformer 79. The power switching means 163 may thereby be used for controllably switching loads which are connected to power lines different from that used to power the controller 10.

The following component types and values have been found operable in accordance with the teachings of a preferred embodiment. Capacitance is in microfarads, 20% tolerance; resistors are in ohms, 5% tolerance, deposited carbon film type.

| COMPONENT | TYPE/VALUE | COMPONENT | TYPE/VALUE |
|---|---|---|---|
| D1 | WL005 M | D2-D11 | 1N4148 |
| C1 | 220, 25 V. | C2 | 0.047 |
| C3, C10 | 1.5 | C6, C7 | 47, 16 V. |
| C8 | 0.1 | C9 | 0.02, 600 V. |
| R2 | 240 | R3, R8, R12, R18 | 10K |
| R4 | 43K | R5 | 30K |
| R6 | 470K | R7 | 16K |
| R9, R10, R11, R16 | 11K | R13, R15, R20 | 100K |
| R14 | 90 | R17 | 10 M |
| R19 | 2.7 M | R21 | 100 |
| R22 | 330 | R23 | 430 |
| R24 | 220 | R25, R26 | 2.2 M |
| R27, R28 | 1K | R29 | 820 |
| R30 | 200 | U1 | LM17L |
| U2 | ½ CA3290 | U3, U4 | 555 |
| U5 | MOC 3021, 500 V. | Q1 | SC140 |
| R30 | 200 | R31 | 6.2K |

While only a single preferred embodiment of the inventive controller has been shown and described, it is not intended to be limited thereby but only by the scope of the appended claims.

I claim:

1. A controller for refrigeration and air conditioning compressor applications comprising:
   hot motor detector means adapted to be coupled to a plurality of temperature sensors for detecting an over-temperature condition of a compressor motor, said hot motor detector means including the first logic switching means for generating a motor control signal;
   sensor detector means coupled to said hot motor detector means and including a comparator and diodes connected to be conductive from sensor to comparator, said sensor detector means detecting only the simultaneous electrically shorted condition of all of said temperature sensors;
   low voltage detector means coupled to said hot motor detector means for detecting a low line voltage condition;
   short cycle protective means coupled to said first logic switching means for preventing short cycle operation of said controller;
   pressure detector means coupled to said hot motor detector means for sensing a signal representative of lubrication oil pressure of said compressor, said pressure detector means being adapted for connection to a pressure transducer having a protective resistor internal thereto;
   said pressure detector means further including means for providing a first starting time delay before enablement of said detector means and a second time delay for preventing disablement of said controller in the event of temporary diminishment of said oil pressure, said second time delay being significantly less than said first time delay;
   power supply means coupled to said low voltage detector means for providing a source of electrical power to said compressor controller, and; p1 isolated output means coupled to said pressure detector means for controllably energizing said compressor motor.

2. The invention set forth in claim 1 wherein said hot motor detector means includes a bridge section coupled to said temperature sensors for generating voltage signals related to sensor temperature.

3. The invention set forth in claim 2 wherein said hot motor detector means further includes an output receiver for sensing said voltage signals generated by said bridge section and providing a predetermined controller response time upon reception of said voltage signals.

4. The invention set forth in claim 3 wherein said controller further includes means for detecting a shorted temperature sensor, said shorted sensors detector including a comparator for de-energizing a compressor motor whenever any one of said sensors exhibits a resistance greater than a predetermined value.

5. The invention set forth in claim 3 wherein said controller further includes means for detecting a shorted temperature sensor, said shorted sensors detector including a comparator for de-energizing a compressor motor whenever the line voltage falls to an unacceptably low value.

6. A multipurpose controller for monitoring a plurality of operating conditions and controlling a compressor motor in refrigeration and air conditioning applications, said controller comprising:
   hot motor detector means adapted to be coupled to a plurality of temperature sensors, said hot motor detector means including a bridge section for generating temperature-related voltage signals and an output receiver for sensing said voltage signals;
   power supply means for providing a source of rectified electrical power to said controller;
   low voltage detector means coupled intermediate said power supply means and said hot motor detector means for sensing a low line voltage condition, said low voltage detector means including means for comparing a first bias voltage having a relationship to line voltage and a second bias voltage having a predetermined relationship to a reference voltage;

a shorted sensors detector coupled to said hot motor detector means and including a comparator and diodes connected to be conductive from sensor to comparator, said sensor detector means detecting only the simultaneous electrically shorted condition of all of said temperature sensors;

a short cycle protective section for preventing energization of said compressor motor unless said motor has been de-energized for a predetermined minimum time;

a lubrication oil pressure detector for disabling said compressor motor upon decrease of lubrication oil pressure to a predetermined pressure, said pressure detector being adapted for connection to a pressure transducer having a protective resistor internal thereto;

said pressure detector further including means for providing a first starting time delay before enablement of said detector and a second time delay for preventing disablement of said controller in the event of temporary diminishment of said oil pressure, said second time delay being significantly less than said first time delay;

isolated output means coupled to said pressure detector means for controllably energizing said compressor motor, said isolated output means including an isolating coupler for isolating power switching means from said pressure detector means.

7. The invention set forth in claim 6 wherein said shorted sensors detector includes means for comparing voltage signals from said hot motor detector and voltage signals from said low voltage detector whereby said motor starting contactor may be de-energized when any of said voltage signals exceeds a predetermined value.

8. The invention set forth in claim 7 wherein said lube oil pressure detector includes means for providing manual reset of said controller over a predetermined range of time periods.

* * * * *

UNITED STATES PATENT AND TRADEMARK OFFICE
CERTIFICATE OF CORRECTION

PATENT NO. : 4,510,547
DATED : April 9, 1985
INVENTOR(S) : Rudich, George, Jr.

It is certified that error appears in the above-identified patent and that said Letters Patent are hereby corrected as shown below:

Column 2, line 24, "severly" should be --severely--

Column 9, line 14, "start" should be --starter--

Column 10, line 30, "pl" should be deleted

Column 10, line 30, "isolated" should start a new subparagraph

Signed and Sealed this

Third Day of September 1985

[SEAL]

Attest:

DONALD J. QUIGG

Attesting Officer    Acting Commissioner of Patents and Trademarks - Designate